United States Patent [19]
Tsukamoto

[11] Patent Number: 5,177,515
[45] Date of Patent: Jan. 5, 1993

[54] WATERPROOF CAMERA

[75] Inventor: Masaaki Tsukamoto, Kawasaki, Japan

[73] Assignee: Nikon Corporation, Tokyo, Japan

[21] Appl. No.: 737,027

[22] Filed: Jul. 29, 1991

[30] Foreign Application Priority Data

Aug. 4, 1990 [JP] Japan .................. 2-82861[U]

[51] Int. Cl.⁵ .............................................. G03B 17/08
[52] U.S. Cl. ........................................................ 354/64
[58] Field of Search .......................................... 354/64

[56] References Cited

U.S. PATENT DOCUMENTS 4,963,902  10/1990  Fukahori ............................ 354/64
4,994,829  2/1991   Tsukamoto ........................ 354/64

Primary Examiner—Michael L. Gellner
Assistant Examiner—David M. Gray
Attorney, Agent, or Firm—Shapiro and Shapiro

[57] ABSTRACT

In a waterproof camera system of the type comprising a waterproof camera comprising a camera mechanism assembly (1) incorporated in a waterproof outer box (4) and a waterproof interchangeable lens (10) comprising an inner cylinder (11) and a waterproof outer cylinder (12) in which is housed said inner cylinder, the outer box is provided with an outer mount (6) and a circular opening (4A) is formed through a wall of said outer mount in coaxial relationship therewith and adjacent thereto. The camera mechanism assembly is provided with an inner mount (5). A first O-ring (15) is fitted over the outer peripheral surface of the outer cylinder which in turn is connected to the outer mount by means of bayonets. The inner cylinder is connected to the inner mount by means of bayonets. A second O-ring (8) is fitted over the peripheral surface of the inner mount which in turn is press-fitted into the circular opening in such a manner that the outer peripheral surface of the inner mount is made in contact with the inner peripheral surface of the circular opening. Thus, the waterproof camera in accordance with the present invention is characterized in that the waterproof type interchangeable lens and the waterproof camera are sealed from the intrusion of water. In addition, the camera mechanism assembly is positioned by the circular opening.

8 Claims, 2 Drawing Sheets

WATERPROOF CAMERA

BACKGROUND OF THE INVENTION

1. Field of the Invention

The present invention relates to a waterproof camera and more particularly a lens mount of a waterproof camera for mounting a waterproof photographic lens on a camera main body.

2. Related Background Art

A lens mount for mounting a waterproof type photographic lens on a camera main body has been disclosed in U.S. Pat. No. 4,994,829. The waterproof camera with the lens mount of the type described above has been well known to those skilled in the art. The construction of such waterproof camera will be briefly described hereinafter for the sake better understanding of the present invention with reference to FIG. 3. A camera mechanism assembly 51 includes a film rewinding mechanism of a camera main body 50. The camera mechanism assembly is incorporated into an outer box 54 whose back is closed by a back plate 52. The back plate 52 is provided with an O-ring which is made into very close watertight contact with the outer box 54. A waterproof photographic lens generally indicated by the reference number 60 comprises an inner cylinder 61 and an outer cylinder 65 and the inner cylinder 61 is fitted into the outer cylinder 65 and is detachably held therein. The inner cylinder 60 is mounted on an inner mount 55 of the camera mechanism assembly 51 while the outer cylinder 65 is mounted on an outer mount 56 of the outer box 54. The outer mount 56 is attached in coaxial relationship with the inner mount 55. The inner cylinder 61 holds lens elements of the waterproof photographic lens 60 and is watertightly sealed with an O-ring 63 interposed between a waterproof glass 62 which covers the front surface of the inner cylinder on the one hand and the outer cylinder 65 on the other side and an O-ring 64 fitted into an O-ring receiving groove 65a of the outer cylinder 65. When the photographic lens 60 is mounted on the camera main body 50, the inner cylinder 61 is mounted through the inner mount 55 on the camera mechanism assembly 51. The outer cylindrical periphery 65 is mounted on the outer box 54 through the outer mount 56 which is watertightly sealed by O-ring 64. However, the waterproof camera with the above described construction has the following problems.

(1) Since various signals are exchanged through electrical contacts between the photographic lens 60 and the camera main body 50, the inner cylinder 60 of the photographic lens 60 must be correctly located at a predetermined position with respect to the camera main body 50. If the axes of the mounts 55 and 56 are offset, the signal exchanges between the electrical contacts cannot be correctly carried out so that there is a fear that the erroneous operation of the camera happens. However, from the standpoint of a degree of precision machining and errors resulting from the assembly step, it is extremely difficult to align the axis of the inner mount 55 securely attached to the camera mechanism assembly 51 incorporated in the outer box 54 with the axis the outer mount 56 on the outer box 54. The reason is that it is difficult to attach the outer mount at a predetermined position on the outer box 54 and mount the inner mount at a predetermined position on the camera mechanism assembly. Furthermore, when the camera mechanism assembly 51 is not mounted in the outer box at a predetermined position. the outer and inner mounts are not in coaxial relationship.

(2) When the photographic lens 60 is forcibly mounted even when the axis of the outer and inner mounts are not aligned with each other, both the inner and outer cylinders 61 and 65 are forcibly mounted on the inner and outer mounts 55 and 56, respectively. in offset relationship with each other. As a result, the O-ring 64 is offset from the correct sealing position so that water very frequently tends to leak into the outer box 54 from an erroneously watertightly sealed portion.

(3) In the case of mounting and dismounting of the photographic lens 60, there is a fear that the water which remains in the O-ring groove 65a tends to permeate into the interior of the outer mount 56. This water flows through the space defined between the outer and inner mounts 56 and 55 into the interior of the outer box 54 so that there exists also a fear that the corrosion of the internal components and the malfunction of the electric circuits result.

SUMMARY OF THE INVENTION

In view of the above. a first object of the present invention is to provide a waterproof camera which is securely made watertight.

In order to attain the above-described object, a waterproof camera incorporating therein a camera mechanism assembly, a watertight outer box in which is housed the camera mechanism assembly and a waterproof interchangeable photographic lens detachably mounted on said outer box, comprises: a first space between the outer box and the interchangeable lens when the latter is mounted on the former; a first sealing member in the form of a ring fitted into said first space; the first sealing member preventing water outside of the outer box from intruding through said first space into the outer box; a second space defined between the outer box and the camera mechanism assembly; a second sealing member characterized by its ability of preventing the water intruded through said first sealing member from flowing into the interior of the camera mechanism assembly.

In the waterproof camera in accordance with the present invention with the above-mentioned construction, the first sealing member is fitted into the space defined by the interchangeable lens and the outer box when the interchangeable lens is mounted in the outer box. In addition, the second sealing member is fitted into the space between the outer box and the camera mechanism assembly so that no water can intrude into the interior of the camera through the space between the outer box and the camera mechanism assembly.

A second object of the present invention is to automatically correct the offset of the optical axes between the camera mechanism assembly and the outer box.

In order to attain the above-described object, a waterproof camera incorporating therein a camera mechanism assembly, a watertight outer box in which is housed the camera mechanism assembly and a waterproof interchangeable photographic lens detachably mounted on the outer box comprises:

an aperture formed through a wall of said outer box; and an elastic member disposed between an inner periphery of said aperture and said camera mechanism assembly and determining the position of said camera mechanism assembly relative to said aperture by imparting a uniform biasing force to said aperture. The interchangeable lens includes an inner cylinder in which a lens is fitted tightly and a waterproof outer cylinder incorporating therein said inner cylinder, and the camera mechanism assembly is provided with a mount for attaching thereon said inner cylinder, the elastic member being disposed between said inner periphery of said aperture and an outer periphery of said mount.

In the waterproof camera in accordance with the present invention, the camera mechanism assembly is aligned with the aperture of the outer box so that the cylinder and the camera mechanism assembly become in coaxial relationship with each other.

DETAILED DESCRIPTION OF THE PREFERRED EMBODIMENTS

The present invention will become more apparent from the following description of a preferred embodiment thereof taken in conjunction with the accompanying drawings.

Figure 1:
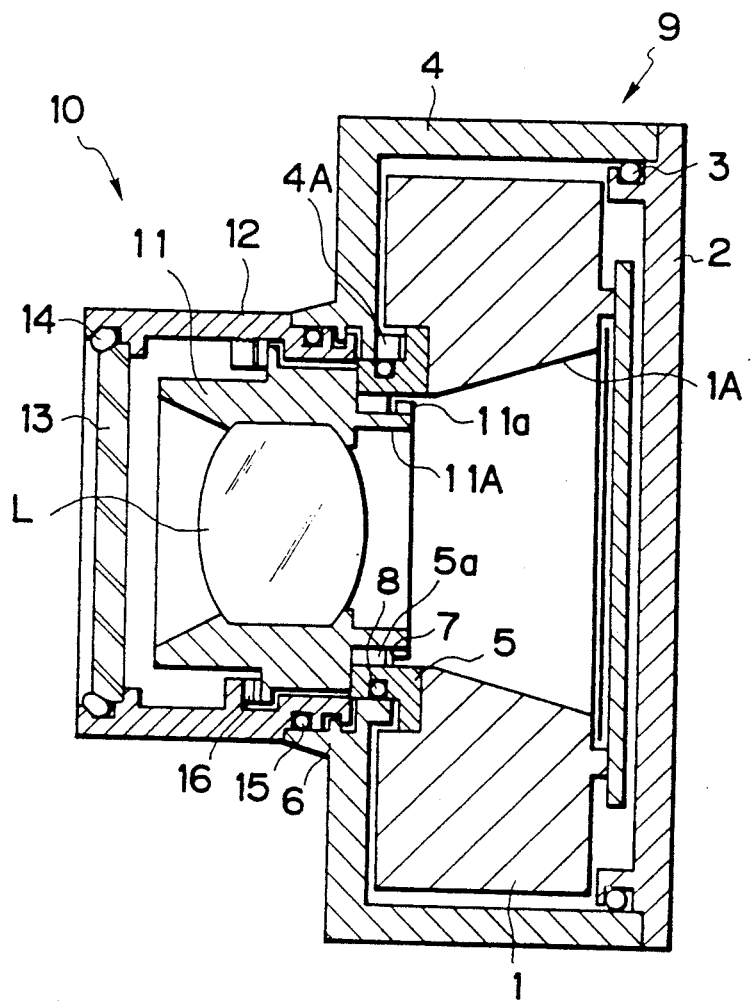
FIG. 1 is a schematic view illustrating the construction of a waterproof camera.

First referring to FIG. 1, a camera mechanism assembly 1 includes a film winding mechanism, a shutter mechanism (both of them not shown) and a film aperture 1A. The camera mechanism assembly 1 is incorporated in a waterproof and pressure-withstanding outer box 4 and is watertightly sealed with a back plate 2 and an O-ring 3. Therefore, the camera mechanism assembly 1 is not subjected to the exterior pressure. An inner mount 5 with a plurality of female bayonet pawls 5a for mounting a photographic lens is attached to the front surface of the camera mechanism assembly 1. In like manner, an outer mount 6 with a plurality of female bayonet pawls 6a for mounting a photographic lens is attached to the front surface of the outer box 4. A circular opening 4A adjacent to the outer mount 6 is extended in the axial direction from the inner surface of the outer mount 6. The axis of the circular aperture 4A is aligned with the axis of the outer mount 6. A second O-ring 8 which is fitted into the inner mount 5 is fitted into the circular opening 4A.

Figure 2:
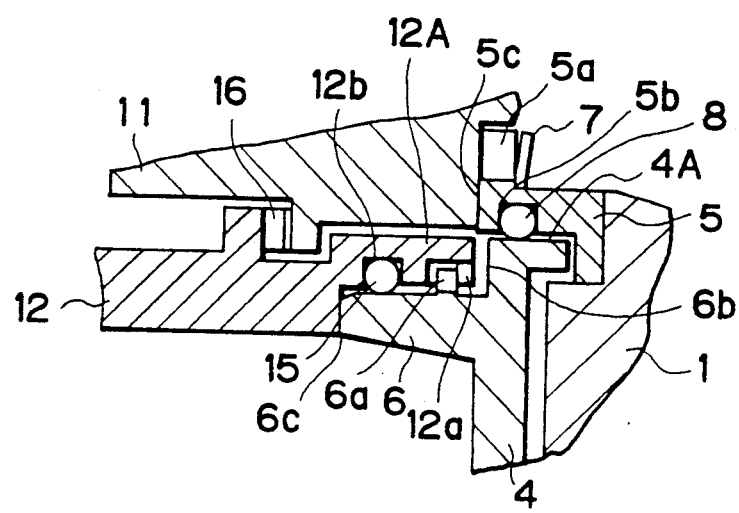
FIG. 2 is a view, on an enlarged scale, illustrating an inner mount and an outer mount in accordance with the present invention.
Figure 3:
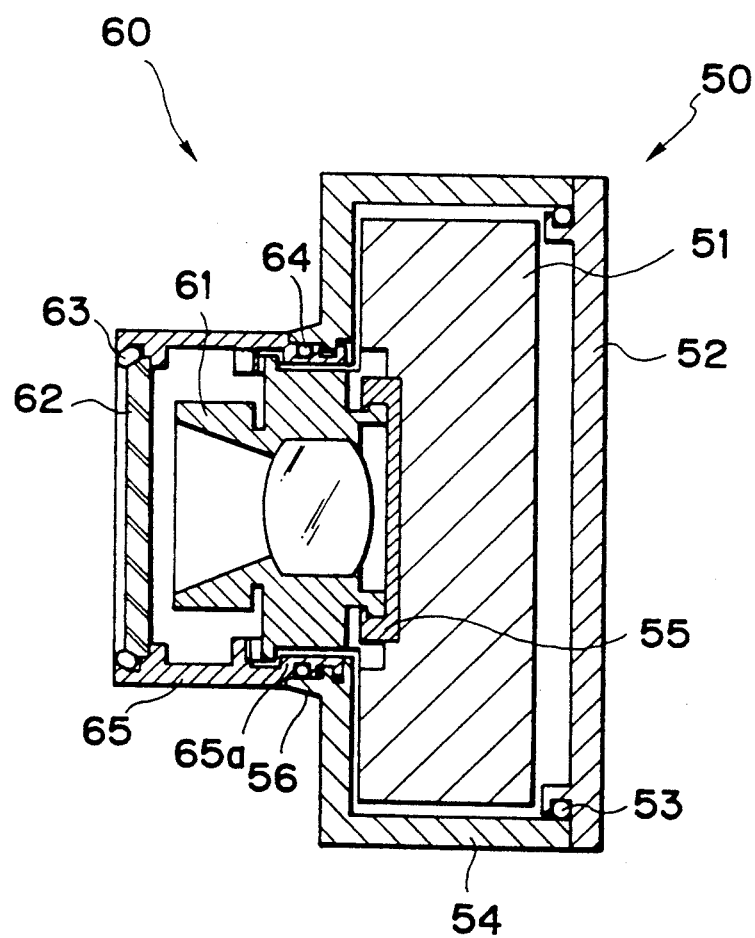
FIG. 3 is a schematic sectional view of a conventional waterproof camera.

As best shown in FIG. 2, one or more bayonet springs 7 are disposed on the back side of the female bayonet pawls 5a of the inner mount 5. An inner cylinder 11 in which are disposed the lens elements of a photographic lens as will be described in detail hereinafter is forcibly pressed against the reference surface 5c of the inner mount 5 under the force of one or more bayonet springs 7. The reference surface 5c of the inner mount 5 is slightly extended beyond the vertical wall 6b of the circular opening extended from the inner surface of the outer mount toward the lens (the left side in FIG. 2). Furthermore, an O-ring groove 5b in which is fitted a second O-ring 8 is formed around the outer peripheral surface of the inner mount 5 and the space between the circular opening 4A of the outer box 4 and the inner mount 5 is watertightly sealed by the O-ring 8 fitted into the groove 5b.

A waterproof lens 10 generally comprises an inner cylinder 11 in which a lens L is fitted tightly and an outer cylinder 12 incorporating therein the inner cylinder 11. The inner cylinder 11 is formed with an inner cylinder mounting portion 11A. A male bayonet pawl 11a is formed at one end of the inner cylinder mounting portion 11A. The male bayonet pawl 11a engages with the corresponding female bayonet pawls 5a of the inner mount 5. As best shown in FIG. 2, a male bayonet pawl 12a is formed on one end of the outer cylinder mounting portion 12A of the outer cylinder 12. The male bayonet pawl 12a engages with the female bayonet pawl 6a of the outer mount 6. A first O-ring 15 is fitted into an O-ring groove 12b formed around the outer peripheral surface of the outer cylinder mounting portion 12A, whereby the space between the outer cylinder mounting portion 12A and the outer mount 6 is watertightly sealed. The pressure produced due to the elasticity of the O-ring 15 acts uniformly over the whole outer peripheral surfaces of the outer cylinder 12 and the outer mount 6. Therefore, the misalignment between the axes of the outer mount of the outer box 4 and the outer cylinder 12 can be automatically corrected. An O-ring 14 is fitted around the other end of the outer cylinder 12, thereby water-tightly sealing the space between a waterproof glass 13 covering the front surface of the inner cylinder 11 on the one hand and the outer cylinder 12 on the other hand.

Both the inner and outer cylinders 11 and 12 are rotated in unison in the circumferential direction of the optical axis by the connection between pins and grooves (both are not shown) and are slightly displaced in the direction of the optical axis by a distance required for the engagement between the male and female bayonet pawls with respect to each other. The inner cylinder 11 is normally biased in the right direction in FIG. 2 under the force of a ring-shaped spring 16. When an interchangeable lens generally designated by the reference numeral 10 is mounted on the camera main body 9, the inner cylinder 11 is attached through the inner mount 5 to the camera mechanism assembly 1 while the outer cylinder 12 is attached through the outer mount 6 to the outer box 4.

The preferred embodiment of a waterproof camera in accordance with the present invention is as just described above. It follows therefore that when the waterproof type interchangeable lens 10 is mounted on the camera main body 9 as shown in FIG. 1, the back of the outer box 4 is water-tightly sealed by the back plate 2 and the O-ring 3 and the space between the outer box 4 and the outer cylinder 12 is water-tightly sealed by the O-ring 15. Thus the interior of the camera is completely water-tightly sealed.

Even in this case, water from the exterior intrudes through the space between the end wall 6c of the outer mount 6 and the outer cylinder 12. This water is prevented by the O-ring 15 from intruding into the interior of the camera and remains outside of the O-ring groove 12b. The water remaining outside of the O-ring groove 12b frequently tends to flow over the O-ring groove 12b and past the female bayonet pawls 6a when the waterproof interchangeable lens is detached from the camera. Sometimes, the water intrudes into the interior of the camera.

But the intruding water is stopped by the vertical wall 6b of the outer mount 6. Even when the intruding water flows over the vertical wall 6b, it only adheres to the vertical wall 6b of the outer mount 6 because the reference surface 5c of the outer mount 5 is stepped toward the lens rather than the vertical wall 6b of the outer mount 6. The O-ring 8 also seals the space between the reference surface 5c and the vertical wall 6b, so no water is allowed to intrude into the camera mechanism assembly 1.

Furthermore, the O-ring 8 is interposed between the inner surface of the circular opening 4A of the outer box 4 and the inner mount 5 and the pressure due to the elasticity of the O-ring 8 uniformly acts on the whole circumferences of the circular opening 4A and the inner mount 5 so that misalignment between the axes of the circular opening 4A of the outer box 4 and the camera mechanism assembly 1 can be automatically corrected.

When the outer box 4 is deformed under the water pressure, the outer cylinder 12 is displaced in the direction of the optical axis because of the engagement between the male bayonet pawl 12a of the outer cylinder and the female bayonet pawl 6a. However, since the ring-shaped spring 16 is interposed between the outer and inner cylinders 12 and 11, the inner cylinder 11 is not affected by the displacement in the direction of the optical axis of the outer cylinder 12. Furthermore, even when the outer cylinder 12 is deformed under the water pressure so that the position of the circular opening is displaced, the O-ring 8 slides along the inner surface of the circular opening 4A while maintaining its water sealing effect so that the camera mechanism assembly 1 is not affected by the water pressure.

Moreover, the inner cylinder 11 of the waterproof type interchangeable lens 10 is pressed against and integrally connected to the reference surface 5c of the inner mount because of the forces of the bayonet springs 7 and the ring-shaped spring 16. As a result, even when the deformation of the outer box 4 under the water pressure occurs so that the camera mechanism assembly 1 and the outer mount 6 are displaced or deviated in the direction of the optical axis, the distance between the lens L and the surface of a film can be maintained unchanged.

What is claimed is:

1. A waterproof camera of the type comprising a camera mechanism assembly, a waterproof outer box in which is incorporated said camera mechanism assembly and a waterproof type interchangeable lens which is detachably mounted in said outer box, further comprising:
   a first space between said outer box and said interchangeable lens when said interchangeable lens is mounted in said outer box; a first sealing member in the form of a ring fitted into said first space, said first sealing member preventing water exterior of said outer box from intruding into said outer box through said first space;
   a second space between said first space and said camera mechanism assembly;
   a second sealing member in the form of a ring fitted into said second space, thereby preventing the intrusion into said camera mechanism assembly of water passing through said first sealing member.

2. A waterproof camera of the type comprising a camera mechanism assembly, a waterproof outer box in which is incorporated said camera mechanism assembly and a waterproof type interchangeable lens which is detachably mounted in said outer box, further comprising:
   an aperture formed through a wall of said outer box;
   a mount securely attached to said camera mechanism assembly, said mount being in the form of a cylinder having a first engagement member at an inner peripheral surface thereof;
   a space between an outer peripheral surface of said mount and an inner peripheral surface of said aperture; and
   an elastic member fitted into said space and imparting a uniform biasing force to the whole outer periphery of said mount so that the space becomes uniform around the whole outer peripheral surface thereof, thereby determining the position of said mount relative to said outer box;
   said interchangeable lens including a cylinder having a lens element fitted therein in contact with an inner peripheral surface thereof and having a second engagement member formed around an outer peripheral surface thereof, said cylinder of said lens being attached to said mount by engagement of said first engagement member with said second engagement member.

3. A waterproof camera system of the type comprising a camera mechanism assembly, a waterproof outer box in which is incorporated said camera mechanism assembly and a waterproof type interchangeable lens which is detachably mounted in said outer box, further comprising:
   a first sealing member adapted to be forcedly fitted between said outer box and said interchangeable lens in order to prevent water from intruding into the exterior of said outer box through a space between said outer box and said interchangeable lens, and
   a second sealing member adapted to be forcedly fitted between said outer box and said camera mechanism assembly in order to prevent the intrusion into said camera mechanism assembly of water passing through said first sealing member.

4. A waterproof camera system of the type according to claim 3, wherein said interchangeable lens includes an inner cylinder in which a lens element is fitted tightly and a waterproof outer cylinder incorporating therein said inner cylinder, and wherein said first sealing member is forcedly fitted between said outer box and said outer cylinder.

5. A waterproof camera system of the type comprising a camera mechanism assembly, a waterproof outer box in which is incorporated said camera mechanism assembly and a waterproof type interchangeable lens which is detachably mounted in said outer box, further comprising:
   an aperture formed through a wall of said outer box;
   an outer mount formed on said outer box and positioned near said aperture;
   a first elastic member disposed between said outer mount and said interchangeable lens in order to determine the position of said interchangeable lens relative to said outer mount by imparting a uniform biasing force to said outer mount; and
   a second elastic member positioned between said aperture and said camera mechanism assembly in order to determine the position of said camera mechanism assembly relative to said aperture by imparting a uniform biasing force to said aperture.

6. A waterproof camera system according to claim 5, wherein said interchangeable lens includes an inner cylinder in which a lens element is fitted tightly and a waterproof outer cylinder incorporating therein said inner cylinder, and wherein said camera mechanism assembly is provided with an inner mount for attaching thereon said inner cylinder. said first elastic member is disposed between said outer mount and said outer cylinder and said second elastic member is positioned between said aperture and said inner mount.

7. A waterproof camera of the type comprising a camera mechanism assembly. a waterproof outer box in which is incorporated said camera mechanism assembly and a waterproof type interchangeable lens which is detachably mounted in said outer box. further comprising:

an aperture formed through a wall of said outer box; and an elastic member disposed between an inner periphery of said aperture and said camera mechanism assembly and determining the position of said camera mechanism assembly relative to said aperture by imparting a uniform biasing force to said aperture.

8. A waterproof camera according to claim 7, wherein said interchangeable lens includes an inner cylinder in which a lens element is fitted tightly and a waterproof outer cylinder incorporating therein said inner cylinder, and wherein said camera mechanism assembly is provided with a mount for attaching thereon said inner cylinder and said elastic member is disposed between said inner periphery of said aperture and an outer periphery of said mount.

* * * * *